United States Patent [19]
Solheim

[11] Patent Number: 5,888,307
[45] Date of Patent: Mar. 30, 1999

[54] METHOD AND MEANS FOR HYDROLYSIS OF ORGANIC MATERIALS

[75] Inventor: Odd Egil Solheim, Hvalstad, Norway

[73] Assignee: Cambi AS, Norway

[21] Appl. No.: 793,325

[22] PCT Filed: Sep. 13, 1995

[86] PCT No.: PCT/NO95/00163

§ 371 Date: Mar. 14, 1997

§ 102(e) Date: Mar. 14, 1997

[87] PCT Pub. No.: WO96/09882

PCT Pub. Date: Apr. 4, 1996

[30] Foreign Application Priority Data

Mar. 28, 1994 [NO] Norway ................................. 943604

[51] Int. Cl.$^6$ ............................... C13K 1/02; G05D 7/00; B01D 35/18; C02F 3/00
[52] U.S. Cl. ................................. 127/37; 34/15; 422/110; 210/750; 210/774; 210/609
[58] Field of Search ................................. 127/37; 34/15; 422/110; 210/750, 774, 609

[56] References Cited

U.S. PATENT DOCUMENTS

| | | |
|---|---|---|
| 3,920,506 | 11/1975 | Morgan ..................................... 162/31 |
| 4,229,296 | 10/1980 | Wheaton et al. ........................ 210/758 |
| 4,753,787 | 6/1988 | Krijgsman ................................ 423/659 |
| 4,876,802 | 10/1989 | Gergely et al. ............................. 34/15 |
| 4,912,078 | 3/1990 | Krijgsman ................................ 502/341 |
| 4,983,374 | 1/1991 | Krijgsman ................................ 423/593 |
| 4,992,105 | 2/1991 | Werner et al. ............................... 127/1 |
| 5,008,375 | 4/1991 | Folbol et al. ............................. 530/357 |
| 5,026,527 | 6/1991 | Krijgsman ................................ 422/110 |
| 5,033,370 | 7/1991 | Fosbol et al. ............................. 99/471 |
| 5,540,847 | 7/1996 | Stultz et al. ............................. 210/750 |

FOREIGN PATENT DOCUMENTS

| | | | |
|---|---|---|---|
| 0253570 | 7/1987 | European Pat. Off. ........... | B01J 3/04 |
| 0116716 | 10/1985 | Germany ............................ | B01J 3/02 |
| WO 89/11797 | 12/1989 | WIPO ................................ | A23J 1/10 |

*Primary Examiner*—Mark L. Bell
*Assistant Examiner*—Patricia L. Hailey
*Attorney, Agent, or Firm*—Austin R. Miller

[57] ABSTRACT

Hydrolyzing organic waste material in a multi-stage reactor comprising a heated first stage, a further heated second stage, a still further heated third stage, and a fourth stage, with a valved exit way connected to the fourth stage and a valve entryway connected to the first stage.

4 Claims, 1 Drawing Sheet

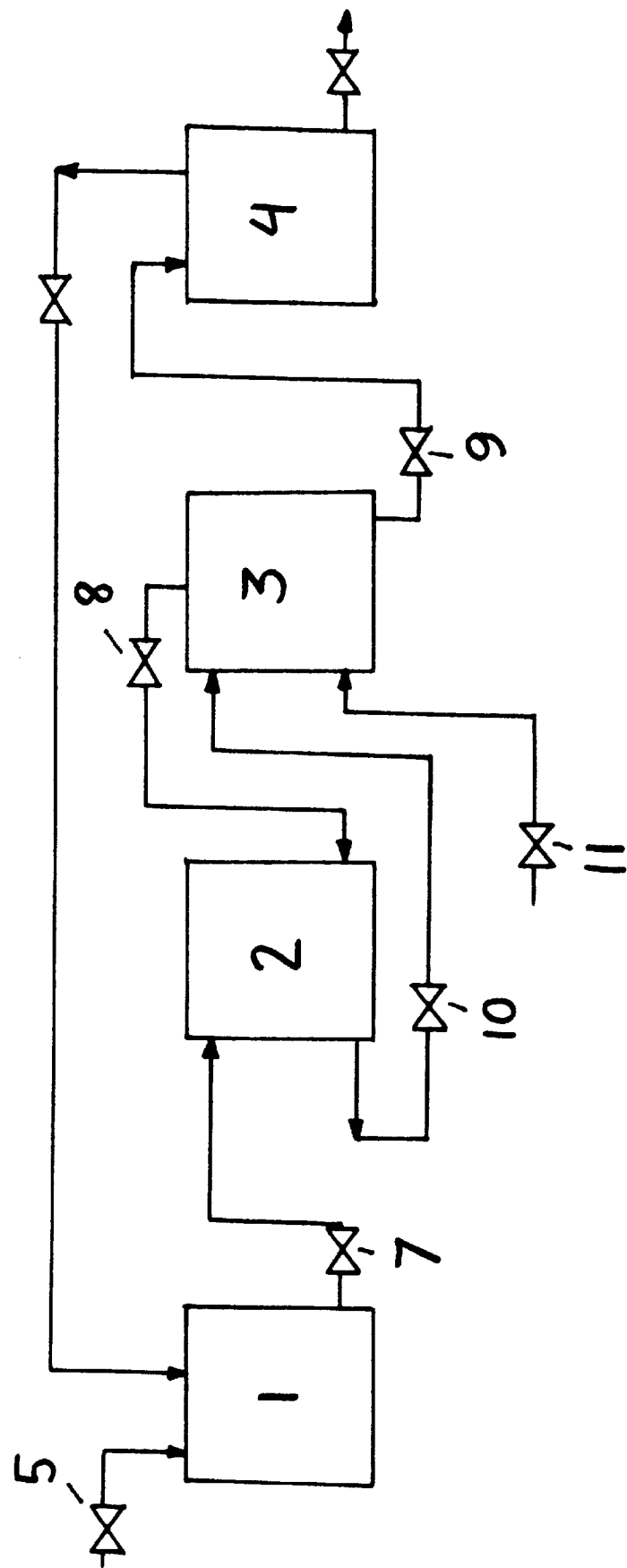

METHOD AND MEANS FOR HYDROLYSIS OF ORGANIC MATERIALS

The present application relates to a method and apparatus for the hydrolysis of organic material.

Norwegian Published Patent Application No. 160907 makes known a method for preparing a reaction product, and also an apparatus for carrying out the method. This publication describes a process wherein two autoclaves/pressure vessels are connected to one another. In order to achieve good economy of heat, heat exchangers are used which, e.g., heat water which is to be mixed with chemicals in the tank 10. When the material is to be transferred from the tank 10 to the tank 12, this takes place in that the pressure in tank 12 is raised so that the pressure difference between the two tanks is as small as possible. The object of this is to achieve a gentle and preferably laminar transfer from the tank 10 to the tank 12, as the product will otherwise be ruined. The method described in this publication is especially intended for the preparation of calcium silicate and is totally unsuitable for carrying out hydrolysis of organic material.

Norwegian Published Patent Application No. 173372 makes known a method and apparatus for preparing a reaction product which would seem to be a further development of the method and apparatus described in Norwegian Published Patent Application No. 160907. The principle of the method according to these two patents would seem, at the point of departure, to be identical.

U.S. Pat. No. 3,525,596 and GB 1 375 741 make known the sluicing out of solid matter in a high pressure process from a liquid stream by using interconnected tanks, which according to need can be pressurised for sluicing out with minimum wear on the valves. Neither of these publications is capable of achieving the objects of the present application.

From the literature it is known that heat treatment of organic material in the temperature range of from 160° C. to 240° C. causes the hydrolysis (decomposition in water) of a considerable portion of the organic material. On this basis, a thermal pre-treatment of organic material such as, e.g., sewage sludge, waste, wet organic wood and other organic materials, has been developed. This method makes use of a regenerative hydrolysis reactor using stepwise heating where high pressure steam is used twice in order to minimise energy consumption.

Relatively short periods in the pre-treatment (5–120 minutes) means that it is not necessary to have tanks of large volume, thereby giving lower energy costs. It is thus possible to treat large amounts of organic material in structures of a relatively small volume.

On the pre-treatment of, e.g., sludge, a degradation of organic material into smaller particles will be obtained, which makes it possible to digest the sludge of high dry matter content. The pre-treatment also means that the nutrients will be more easily accessible to bacteria.

By using this pre-treatment in sludge processing plants, a simultaneous pasteurisation and sanitation of the sludge is achieved. It will then also be possible to reduce the amount of residual sludge after the digestion.

A thermal hydrolysis of organic material can be carried out in two ways. The process is run either by means of indirect heating or direct heating using, e.g., steam. In some cases, acid has also been added in order to obtain enhanced hydrolysis.

In indirect heating plants, the heat treatment takes place in heat exchangers. In terms of thermodynamics, this is a good method as it is easy to achieve a good heat exchange. In practice, this method causes operational problems because of the build-up of fouling on the heating surface, as well as problems of wear in pressure reduction valves.

The direct process is in many ways simpler. A pressure tank is filled with organic material and water. Steam is released into the bottom of the tank and raises the temperature to the desired level. Once the desired process time is over, the bottom valve is opened and the processed mass is discharged. The advantage of this technique is that the equipment is simple, but there are problems in achieving good heat recovery and a further problem is that the exhaust pressure, and thus the wear on the exhaust valve, is high.

The popularisation of hydrolysis processes has therefore been prevented because indirect systems give rise to major maintenance problems and direct systems have a tendency to result in high energy consumption.

It is therefore the aim of the present invention to provide a method and an apparatus wherein the aforementioned problems have been eliminated.

One of the objects of the present invention is to provide a method of hydrolysis of organic material wherein the valve wear caused by the transfer of the organic material owing to a great differential pressure between two reaction vessels is minimised.

A second object of the present invention is to provide a method of hydrolysis of organic material where the consumption of energy is optimised.

Yet another object of the present invention is to provide an apparatus for carrying out the method.

These objects are achieved by means of a method and apparatus which are characterised by the features disclosed in the accompanying claims.

The invention will be described in more detail below, with reference to the accompanying FIGURE, which schematically shows an exemplary embodiment of a plant for carrying out the method according to the invention.

The FIGURE illustrates a plant for the hydrolysis of organic material consisting of four reaction vessels 1, 2, 3 and 4. It is assumed that the plant is in operation. A mixture 5 of organic material and optionally water is fed into the first reaction vessel 1. Steam 6 is also conducted into the reaction vessel 1, for example, from a later process step or from an external source (not shown). When the temperature of the mixture in the reaction vessel 1 has reached a desired level, e.g., 80° C., the valve 7 is opened and the mixture is transferred to the reaction vessel 2, e.g., by means of a pump (not shown).

When the level of the reaction vessel 2 has reached a desired value, the feeding of the mixture is stopped. In practice, the pumping rate is controlled so that the pumping is continuous.

The mixture in the reaction vessel 2 is heated to, e.g., 130° C., in that flash steam from the reaction vessel 3 is released into the reaction vessel 2 in that the valve 8 is opened. Pressure release in the reaction vessel 3 is completed when the pressure therein has fallen to 2–5 bars (corresponding to 120°–150° C.). The valve 8 is then closed. The hydrolysed mass in the reaction vessel 3 is then transferred to the reaction vessel 4 in that the valve 9 is opened and the reaction vessel 3 is emptied.

The organic material in the reaction vessel 2, which has been preheated to about 120°–140° C., is transferred from the reaction vessel 2 to the reaction vessel 3 in that the valve 10 is opened. The pressure difference between reaction vessel 2 and reaction vessel 3 is in the range of 2–4 bars at the instant the valve 10 is opened. The transfer can also take place with the aid of a pump.

The valve 10 is kept open until the right level in the reaction vessel has been reached. The valve 10 is then closed. Steam is fed into the reaction vessel 3 by keeping the valve 11 open until the desired pressure/temperature has been reached, e.g., 10–25 bars. The valve 11 is then closed. When the process time is over (e.g., 5–60 minutes), the valve 8 is opened and flash steam is released into the reaction vessel 2 in order to heat the mass therein. In the interim, reaction vessel 2 is filled with organic material and optionally water. The valve 8 may remain open until the pressure is as great in reaction vessel 2 as in reaction vessel 3, and is subsequently closed.

The valve 8 may also be closed when the pressure in reaction vessel 3 is at the desired level, if this pressure is higher than the equalising pressure. The valve 9 is then opened and the hydrolysed mass is transferred to the reaction vessel 4 owing to the pressure difference between reaction vessel 3 and reaction vessel 4. This pressure difference is in the range of 2–4 bars. The mass will then be subjected to a steam explosion which will further comminute the mass.

The process is repeated in that a fresh amount of organic material and optionally water is conducted into reaction vessel 1 via valve 5.

The hydrolysate reaches the reaction vessel 4 at a temperature of about 100° C. The hydrolysate may, if so desired, be cooled and the fed mass may be preheated to about 80°–90° C., e.g., in that the hydrolysate from the reaction vessel 4 is heat exchanged with mass fed into reaction vessel 1. A heat exchange of this kind will then take place in a temperature range where the problems of fouling are minor.

I claim:

1. A continuous method of hydrolyzing organic waste material including sewage sludge, waste, and wet organic wood, in a multi-stage reactor comprising steam-containing first, second, third and fourth stages, each of the first three stages having a valved exitway for transporting said organic waste material to a succeeding stage under steam pressure, and said fourth stage having a processed waste material exit and a valved entryway, the steps of which comprise:

(a) feeding said organic waste material into said first stage through its said valved entryway;

(b) heating said organic waste material within said first stage by introducing previously generated fourth stage steam into said first stage through a first valved steam supply line connecting said first stage with said fourth stage, thereby forming preheated organic material;

(c) opening a first valved material supply line which connects said first stage with said second stage, and pushing said preheated organic material from said first stage to said second stage through said first valved material supply line;

(d) further heating said preheated organic material in said second stage by supplying steam from said third stage through a second valved steam supply line connecting said second stage with said third stage;

(e) closing said second valved steam supply line after pressurizing said second stage;

(f) opening a second valved material supply line connecting said second stage with said third stage and passing said preheated organic material from said second stage to said third stage through said second valved material supply line;

(g) re-pressurizing and further heating said preheated organic material in said third stage by introducing steam through a third valved steam supply line;

(h) opening a third valved material supply line which connects said third stage with said fourth stage, and passing said preheated organic material from said third stage to said fourth stage through said third valved material supply line;

(i) holding said preheated organic material in said fourth stage;

(j) passing said preheated organic material out of said fourth stage through said valved exitway; and (k) again passing said fourth stage steam from said fourth stage to a previous stage.

2. A. The method according to claim 1, wherein the pressure in said third stage prior to releasing said pressure is in the range of 10–25 bars.

3. The method according to claim 1, wherein the pressure difference between said second stage and said third stage is in the range of 2–4 bars at the time said second valved material supply line is opened pursuant to paragraph (f) of claim 1.

4. A continuous method of hydrolyzing organic waste material including sewage sludge, waste, and wet organic wood, in a multi-stage reactor comprising a first stage, a second stage, a third stage, a fourth stage, a valved exitway connected to said fourth stage, and a valved entryway connected to said first stage, the steps of which comprise:

(a) feeding said organic waste material into said first stage through said valved entryway;

(b) heating said organic waste material within said first stage by introducing previously generated fourth stage steam into said first stage through a first valved steam supply line connecting said first stage with said fourth stage, thereby forming preheated organic material;

(c) opening a first valved material supply line which connects said first stage with said second stage, and pumping said preheated organic material from said first stage to said second stage through said first valved material supply line using a pump;

(d) further heating said preheated organic material in said second stage by supplying steam from said third stage through a second valved steam supply line connecting said second stage with said third stage, said third stage having a higher pressure than said second stage before said second valved steam supply line is opened;

(e) closing said second valved steam supply line after pressurizing said second stage;

(f) opening a second valved material supply line connecting said third stage with said fourth stage, and passing said preheated organic material from said third stage to said fourth stage;

(g) opening a third valved material supply line connecting said second stage with said third stage, and passing said preheated organic material from said second stage to said third stage through said third valved material supply line;

(h) re-pressurizing and further heating said preheated organic material in said third stage by introducing steam from an external steam source through a third valved steam supply line connecting said third stage with said external steam source;

(i) opening said second valved material supply line which connects said third stage with said fourth stage and passing said organic material from said third stage to said fourth stage through said second valved material supply line;

(j) holding said preheated organic material in said fourth stage;

(k) passing said organic material out of said fourth stage through said valved exitway; and (l) passing said fourth stage steam from said fourth stage to said first stage through said first valved steam supply line connecting said fourth stage and said first stage.

* * * * *